(12) United States Patent
Song et al.

(10) Patent No.: US 12,533,844 B2
(45) Date of Patent: Jan. 27, 2026

(54) NOZZLE-REPLACEABLE PRINTING HEAD FOR CONTINUOUS FIBER PRINTING AND PRINTING METHOD

(71) Applicant: NANJING UNIVERSITY OF AERONAUTICS AND ASTRONAUTICS, Nanjing (CN)

(72) Inventors: Wenzhe Song, Nanjing (CN); Zhongde Shan, Nanjing (CN); Congze Fan, Nanjing (CN); Yiwei Chen, Nanjing (CN); Jinghua Zheng, Nanjing (CN); Yaxing Song, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 144 days.

(21) Appl. No.: 18/552,909

(22) PCT Filed: Jul. 23, 2022

(86) PCT No.: PCT/CN2022/107549
§ 371 (c)(1),
(2) Date: Sep. 28, 2023

(87) PCT Pub. No.: WO2023/216420
PCT Pub. Date: Nov. 16, 2023

(65) Prior Publication Data
US 2024/0227287 A1    Jul. 11, 2024

(30) Foreign Application Priority Data

May 13, 2022  (CN) .......................... 202210518896.7

(51) Int. Cl.
*B29C 64/209*    (2017.01)
*B29C 64/393*    (2017.01)
(Continued)

(52) U.S. Cl.
CPC .......... *B29C 64/209* (2017.08); *B29C 64/393* (2017.08); *B33Y 10/00* (2014.12);
(Continued)

(58) Field of Classification Search
CPC ... B29C 64/118; B29C 64/209; B29C 64/393; B29C 64/321; B29C 64/343; B33Y 10/00; B33Y 30/00
See application file for complete search history.

(56) References Cited

U.S. PATENT DOCUMENTS

2017/0266876 A1*  9/2017  Hocker ................. B29C 64/106
2021/0053293 A1*  2/2021  MacNeish, III ...... B29C 64/118
(Continued)

FOREIGN PATENT DOCUMENTS

CN    203485449 U    3/2014
CN    108274755 A    7/2018
(Continued)

OTHER PUBLICATIONS

Machine Translation of Jiang, Espacenet, generated Apr. 16, 2025 (Year: 2017).*

*Primary Examiner* — Andrew L Swanson
(74) *Attorney, Agent, or Firm* — Bayramoglu Law Offices LLC (57) ABSTRACT

A nozzle-replaceable printing head for continuous fiber printing and a printing method are provided. The printing head includes a fixed bracket, a wire feeding module located at an upper part of the structure, an upper guide pipe, a shearing module located at a middle part of the structure, a lower guide pipe, a heat dissipation sleeve, a throat pipe, a heating coil, and a nozzle module located at a bottom of the structure, where a continuous fiber reinforced thermoplastic resin matrix pre-impregnated composite wire coaxially penetrates through the other side of the printing head from top
(Continued)

to bottom and is fed for printing. An adjustment groove with scales is configured to standardize adjustment on clamping and feeding states of pre-impregnated composite wires of different specifications.

6 Claims, 5 Drawing Sheets

(51) Int. Cl.
    *B33Y 10/00* (2015.01)
    *B33Y 30/00* (2015.01)
    *B33Y 50/02* (2015.01)
    *B29C 64/118* (2017.01)
    *B29C 64/321* (2017.01)
    *B29C 64/343* (2017.01)

(52) U.S. Cl.
    CPC .............. *B33Y 30/00* (2014.12); *B33Y 50/02* (2014.12); *B29C 64/118* (2017.08); *B29C 64/321* (2017.08); *B29C 64/343* (2017.08)

(56) References Cited

U.S. PATENT DOCUMENTS

| | | | |
|---|---|---|---|
| 2022/0194006 A1* | 6/2022 | Smith | ............... B22F 10/18 |
| 2024/0399658 A1* | 12/2024 | Shvalb | ............... B29C 64/386 |

FOREIGN PATENT DOCUMENTS

| | | | | |
|---|---|---|---|---|
| CN | 108367464 A | | 8/2018 | |
| CN | 207859484 U | | 9/2018 | |
| CN | 109016490 A | * | 12/2018 | ............ B33Y 40/00 |
| CN | 109177166 A | | 1/2019 | |
| CN | 211279758 U | | 8/2020 | |
| CN | 212219300 U | | 12/2020 | |
| CN | 113147021 A | | 7/2021 | |
| CN | 114407358 A | | 4/2022 | |
| KR | 20160099125 A | | 8/2016 | |
| WO | WO-2022038270 A1 | * | 2/2022 | ........... B29C 64/118 |

* cited by examiner

NOZZLE-REPLACEABLE PRINTING HEAD FOR CONTINUOUS FIBER PRINTING AND PRINTING METHOD

CROSS REFERENCE TO THE RELATED APPLICATIONS

This application is the national phase entry of International Application No. PCT/CN2022/107549, filed on Jul. 23, 2022, which is based upon and claims priority to Chinese Patent Application No. 202210518896.7, filed on May 13, 2022, the entire contents of which are incorporated herein by reference.

TECHNICAL FIELD

The present invention belongs to the field of advanced manufacturing technologies, in particular to a nozzle-replaceable printing head for continuous fiber printing and a printing method.

BACKGROUND

Continuous fiber reinforced resin matrix composites are composed of fiber materials and matrix materials, have advantages of light weight, high strength, easy forming, corrosion resistance, and the like, and are mainly used in fields of aerospace, rail transit, vehicles, ships, and the like. Compared to conventional fiber placement or winding manufacturing technologies, 3D printing manufacturing technologies based on the principle of melt extrusion have become a key development trend in the future due to their characteristics of easier forming of complex structures, no mold requirement, relatively simple process implementation, and the like.

Pre-impregnated composite wire printing is an important process for continuous fiber reinforced thermoplastic resin matrix composite printing, and printing wire feeding therein includes active wire feeding and passive wire feeding. At present, related structural patents for printing heads are mostly seen in various active wire feeding and shearing devices. An active wire feeding structure is similar to a pure resin wire feeding mechanism, where a spring is used as a damper, and a clamping state of a wire is adjusted by screwing in or loosely pressing into a connecting rod structure through bolts. This method mostly relies on experiential hand feel, and there is no clear indication for adjusting the clamping state. However, shearing devices commonly operate in two manners: electric linkage structure shearing or pneumatic direct push cutting. Either operation is likely to cause extrusion deformation of wires at break, making it difficult to feed subsequent wires. Particularly, in the presence of continuous fiber reinforcements, printing of pre-impregnated wires is likely to wear a nozzle, which indirectly increases layer thickness and distance. This problem is more obvious especially when large members require continuous and long-term additive manufacturing. Therefore, timely replacement of the nozzle is required to ensure forming quality. However, when a device is stopped to replace a nozzle, the device is required to be reset, which seriously limits forming efficiency.

SUMMARY

To solve the above problems, the present invention discloses a nozzle-replaceable printing head for continuous fiber printing and a printing method to prevent forming quality of parts from being affected by nozzle wear caused by long-term printing of continuous fiber reinforced resin matrix composite pre-impregnated wires during forming of large-sized target parts, so as to achieve efficient and high-quality forming of parts.

In order to achieve the above objective, the present invention provides the following solution:

A nozzle-replaceable printing head for continuous fiber reinforced composite additive manufacturing includes a fixed bracket, a wire feeding module located at an upper part of the structure, an upper guide pipe, a shearing module located at a middle part of the structure, a lower guide pipe, a heat dissipation sleeve, a throat pipe, a heating coil, and a nozzle module located at a bottom of the structure, where the printing head is mounted on a motion apparatus of a printing device through a top hole position of the fixed bracket.

Further, power motors of the wire feeding module, the shearing module, and the nozzle module are all mounted on one side of the top hole position of the fixed bracket, and a continuous fiber reinforced thermoplastic resin matrix pre-impregnated composite wire coaxially penetrates through the other side of the printing head from top to bottom and is fed for printing.

Further, the upper guide pipe, the lower guide pipe, and the throat pipe are all mounted on the fixed bracket through threads, where the half-wrapped lower guide pipe has a hemispherical notch at one end, and when the shearing module performs a cutting operation, a cutting blade can fit and cut into an inner wall of the lower guide pipe from the notch of the lower guide pipe; the heat dissipation sleeve is mounted to an upper end of the throat pipe through threads; and the heating coil is mounted to a lower end of the throat pipe.

Further, the wire feeding module mainly includes a feeding motor, a meshing gear, a U-groove bearing, a fixing bolt, and a fixing nut; the U-groove bearing is mounted with the fixing nut in an adjustment groove at the upper part of the bracket through the fixing bolt; and the adjustment groove and a head of the fixing bolt are marked with scales, which can be used for adjusting a gap between the U-groove bearing and the meshing gear, so as to fit different diameter specifications of the pre-impregnated composite wire or meet requirements for different clamping and feeding states of the wire.

Further, the shearing module mainly includes a shearing motor, a cam, a push tool holder, a cutting blade, a reset spring, and a track sleeve holder; the cutting blade is fixed to the push tool holder through screws, passes through the reset spring, and is fed into a sleeve of the track sleeve holder to form the shearing module; an aperture of the sleeve of the track sleeve holder on one side is larger than that on the other side, and the reset spring is limited to the small aperture side; the cam is fixed to a shaft of the shearing motor through a key; and the cam cooperates with the reset spring to push the push tool holder back and forth under the drive of the shearing motor, so as to drive the cutting blade to achieve a horizontal cutting operation.

Further, the nozzle module mainly includes a rotating motor, a nozzle support plate, and several nozzles, where the nozzle support plate is perpendicular to the throat pipe and mounted together with the rotating motor through keys; the nozzles are mounted on the nozzle support plate through threads, and the nozzles are evenly distributed on an arc with a rotating shaft of the rotating motor as a center and the distance between the center of the rotating shaft and the center of the throat pipe as a radius; and the rotating motor drives the nozzle support plate to rotate a set angle, and a target nozzle can be switched to be below the throat pipe and coaxial with the throat pipe, so as to complete replacement of the nozzle of the printing head.

Further, upper and lower surfaces of the nozzle support plate have a planeness of ≤0.1 mm; the nozzles are strictly consistent in height specifications, and can have the same or different aperture specifications according to actual needs; and after mounting, tips of the nozzles are coplanar and parallel to a bottom surface of the nozzle support plate. Threaded hole positions for the nozzles on the nozzle support plate can be customized, and 3-9 hole positions can be provided and evenly distributed every fixed angle.

The nozzles include a main nozzle and secondary nozzles, where the secondary nozzles include spare nozzles and nozzles for other purposes. The spare nozzles have the same specification as the main nozzle, and are used for replacing the worn main nozzle; and the nozzles for other purposes have inner diameters greater than the inner diameter of the main nozzle, and are used for replacing the pre-impregnated wire with other specifications during printing.

According to the printing head of the present invention, the adjustment groove with scales is configured to standardize adjustment on clamping and feeding states of pre-impregnated composite wires of different specifications; the upper guide pipe and the half-wrapped lower guide pipe are configured to improve the shearing ability of the pre-impregnated wire and the subsequent feeding ability of the broken wire; and the rotating nozzle support plate is configured for replacement of the spare nozzles or nozzles with different diameter specifications in on-line printing, so as to reduce forming defects caused by nozzle wear in long-time printing and achieve efficient and high-quality forming of parts.

The present invention further provides a technical solution of a printing method according to the foregoing nozzle-replaceable printing head for continuous fiber reinforced composite additive manufacturing, including the following steps:

1) selecting a specification of a pre-impregnated composite wire according to forming requirements of a target part;
2) importing a three-dimensional model of the target part into open-source printing slice software, performing hierarchical discrete slicing and path planning, and setting a printing speed and basic printing process parameters to obtain basic printing forming data G code and estimated printing time of the part;
3) analyzing each jumper position in the G code, adding a pause and shearing instruction 20 mm in advance, combining printing time, wear life of a nozzle and replacement requirements of the pre-impregnated wire, adding a pause, shearing and nozzle replacing instruction 10 mm in advance, and updating the G code;
4) threading the pre-impregnated wire into the printing head until passing through the nozzle by 10-15 mm, adjusting the fixing position of the fixing bolt in the adjustment groove according to the diameter of the pre-impregnated wire, and selecting an appropriate feeding and clamping state of the wire;
5) reading the G code, heating the heating coil to a set printing temperature, feeding the wire by the wire feeding module according to the printing speed, and printing the target part in a layer-by-layer stacking manner according to the G code;
6) in face of a jumper position during printing, executing the predetermined pause and shearing instruction, and stopping three-dimensional printing motion of the printing head and the wire feeding module; after the shearing module completes shearing, restoring the three-dimensional printing motion of the printing head until the remaining wire cut in the printing head is passively exhausted; stopping the printing head again, lifting the printing head by 15 mm in a printing Z direction, restoring the feeding of the wire by the wire feeding module until the wire passes through the nozzle by 10-15 mm, lowering the printing head by 15 mm in the Z direction, and restoring the three-dimensional printing motion of the printing head together with the wire feeding module, to continue the printing operation;
7) when the nozzle is required to be replaced during printing, executing the predetermined pause, shearing and nozzle replacing instruction, and stopping the three-dimensional printing motion of the printing head and the wire feeding module; after the shearing module completes shearing, restoring the three-dimensional printing motion of the printing head until the remaining wire cut in the printing head is passively exhausted; stopping the printing head again, lifting the printing head by 15 mm in the printing Z direction, and actuating the nozzle module to work; after the replacement of the nozzle is completed, restoring the feeding of the wire by the wire feeding module until the wire passes through the nozzle by 10-15 mm, lowering the printing head by 15 mm in the Z direction, and restoring the three-dimensional printing motion of the printing head together with the wire feeding module, to continue the printing operation; and
8) referring to steps 6) and 7) for jumper positions and replacement of the nozzle in the process of layer-by-layer stacking until the target part is finally manufactured.

Further, specifications of the pre-impregnated composite wire include a type of resin matrix, a type of reinforced fibers, a wire diameter, and a volume percentage of the reinforced fibers. Different specifications of pre-impregnated wires correspond to different feeding and clamping states, namely, correspond to different scales.

Further, the basic printing process parameters in step 2) include forming channel spacing, layer thickness, printing temperature, and platform temperature.

Further, the distance considered in step 3) refers to the distance between a shearing point of the wire in the printing head and the nozzle, and after the wire is cut, the remaining wire is used in a passive printing manner.

Further, the operation of replacing the nozzle in step 7) allows for collaborative replacement of pre-impregnated wires with different material specifications and nozzles with corresponding diameter specifications, so as to achieve heterogeneous multi-layer printing forming of parts with specific application requirements.

Beneficial effects are as follows: the foregoing printing method provided by the present invention is based on continuous fiber reinforced composite additive manufacturing, where a database of feeding and clamping states corresponding to different specifications of pre-impregnated wires is established, adjustment on the clamping and feeding states of continuous fiber pre-impregnated wires is standardized based on the scales of the adjustment groove, and spare nozzles or nozzles with different diameter specifications are replaced in on-line printing by cooperation of the shearing module and the nozzle module, so as to achieve efficient and high-quality forming of parts and achieve heterogeneous multi-layer forming printing of parts with specific application requirements.

DETAILED DESCRIPTION OF THE EMBODIMENTS

The present invention will be further illustrated below with reference to the accompanying drawings and specific embodiments. It should be understood that the following specific embodiments are merely used for describing the present invention, rather than limiting the scope of the present invention. It should be noted that the terms "front", "back", "left", "right", "upper", and "lower" used in the following description refer to directions in the drawings, and the terms "inner" and "outer" refer to directions towards or away from geometric centers of specific components.

Embodiment 1

Figure 1:
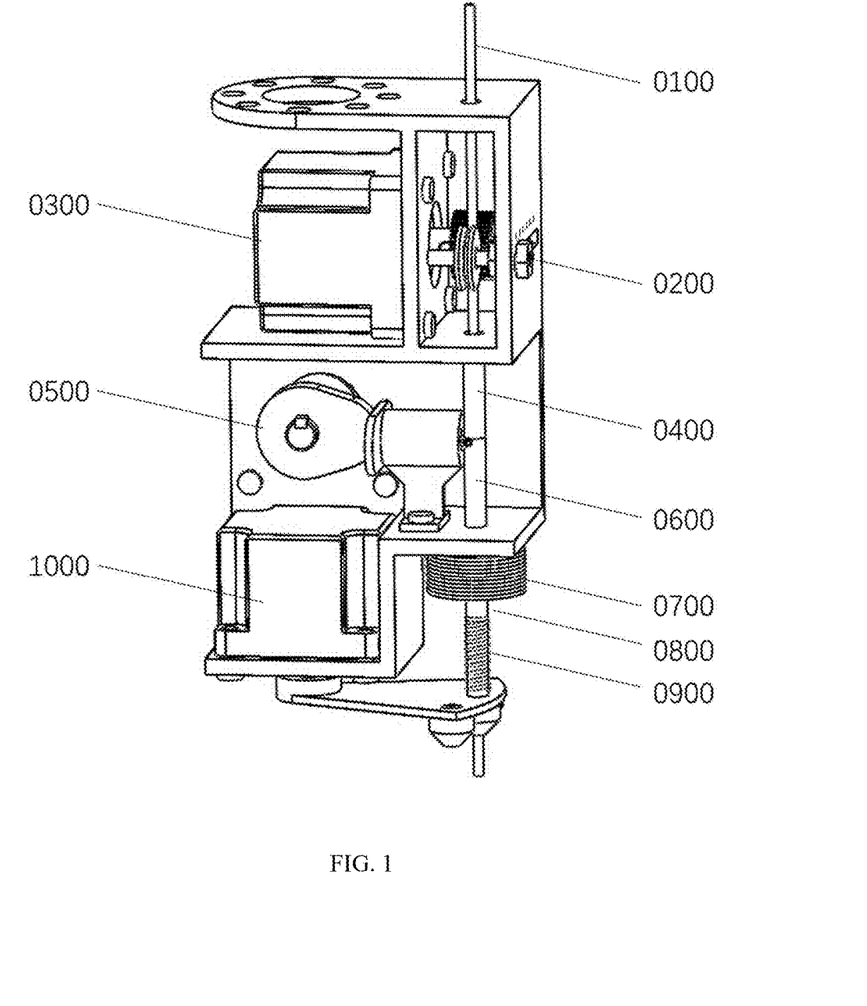
FIG. 1 is a schematic diagram of an overall structure of a printing head in the present invention.

As shown in FIG. 1, this embodiment is a nozzle-replaceable printing head for continuous fiber reinforced composite additive manufacturing, including a fixed bracket 0200, a wire feeding module 0300 located at an upper part of the structure, an upper guide pipe 0400, a shearing module 0500 located at a middle part of the structure, a lower guide pipe 0600, a heat dissipation sleeve 0700, a throat pipe 0800, a heating coil 0900, and a nozzle module 1000 located at a bottom of the structure. The printing head is mounted on a motion apparatus of a printing device through a top hole position of the fixed bracket 0200. The motion apparatus of the printing device can drive the printing head to achieve three-dimensional motion of printing forming.

Figure 2:
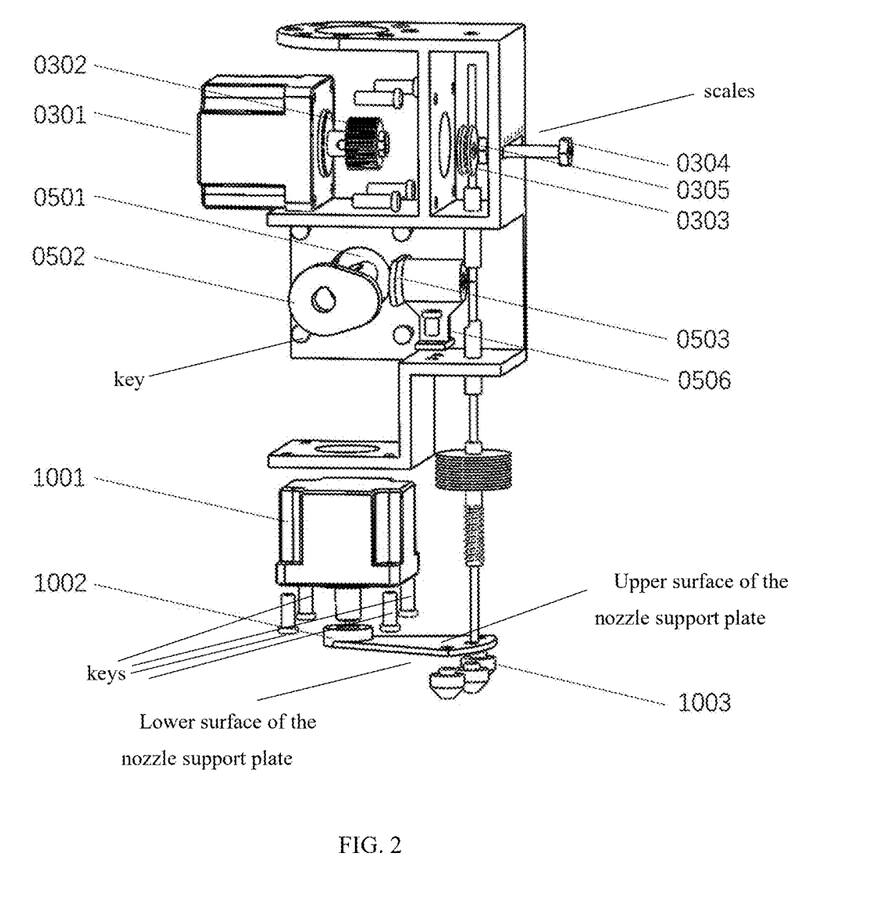
FIG. 2 is a schematic split diagram of a main structure of the printing head in the present invention.
Figure 6:
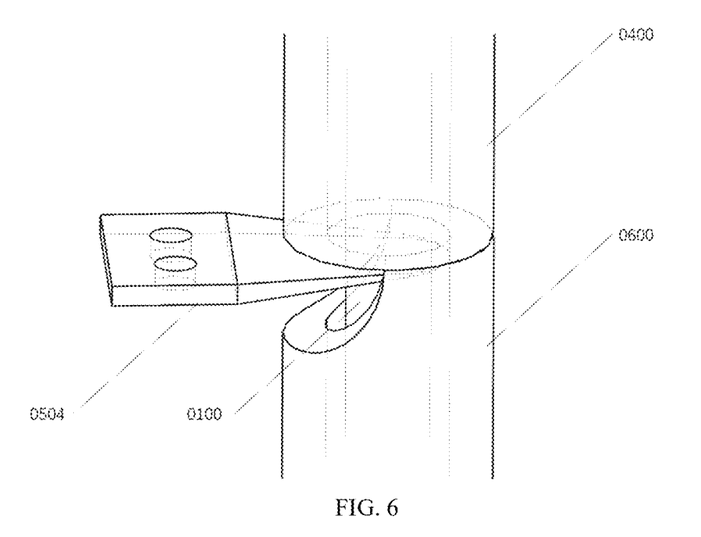
FIG. 6 is a partially schematic diagram of a guide pipe during the shearing operation in the present invention.

In this embodiment, power motors of the wire feeding module 0300, the shearing module 0500, and the nozzle module 1000 are all mounted on one side of the top hole position of the fixed bracket 0200, and a continuous fiber reinforced thermoplastic resin matrix pre-impregnated composite wire 0100 coaxially penetrates through the other side of the printing head from top to bottom and is fed for printing. The upper guide pipe 0400, the lower guide pipe 0600, and the throat pipe 0800 are all coaxially mounted on the fixed bracket 0200 through threads, and an inner diameter of a flow channel is 0.5-0.8 mm larger than a diameter of the pre-impregnated wire 0100 and is the same as an aperture of a main nozzle 1003. The half-wrapped lower guide pipe 0600 has a hemispherical notch at one end, and when the shearing module 0500 performs a cutting operation, a cutting blade 0504 can fit and cut into an inner wall of the lower guide pipe 0600 from the notch of the lower guide pipe 0600; the heat dissipation sleeve 0700 is mounted to an upper end of the throat pipe 0800 through threads; and the heating coil 0900 is mounted to a lower end of the throat pipe 0800.

Figure 3:
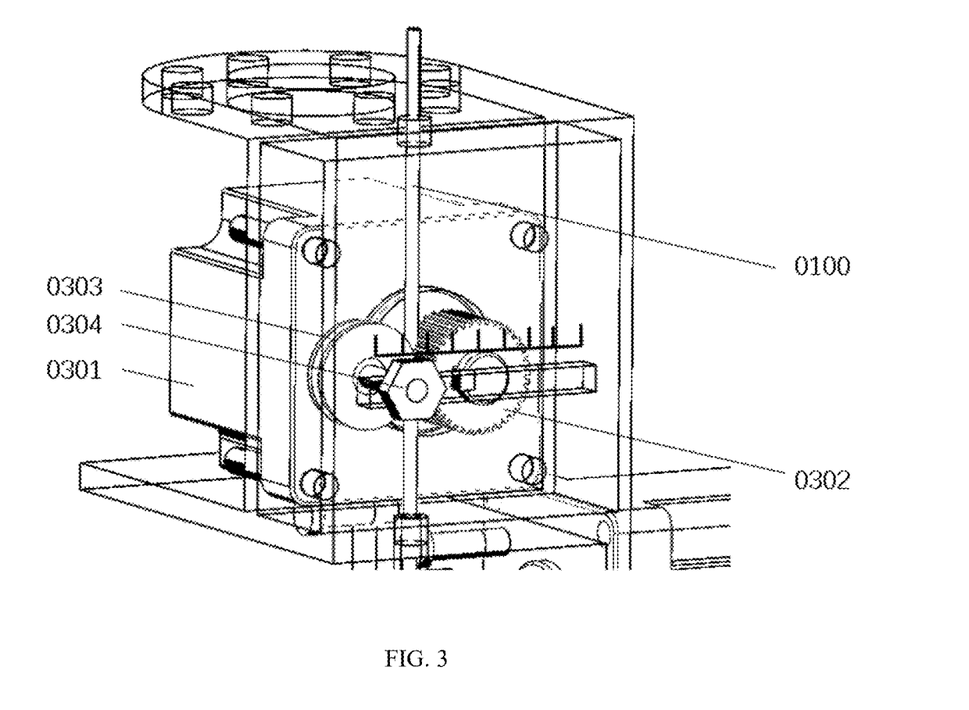
FIG. 3 is a partially enlarged view of a wire feeding module in the present invention.
Figure 4:
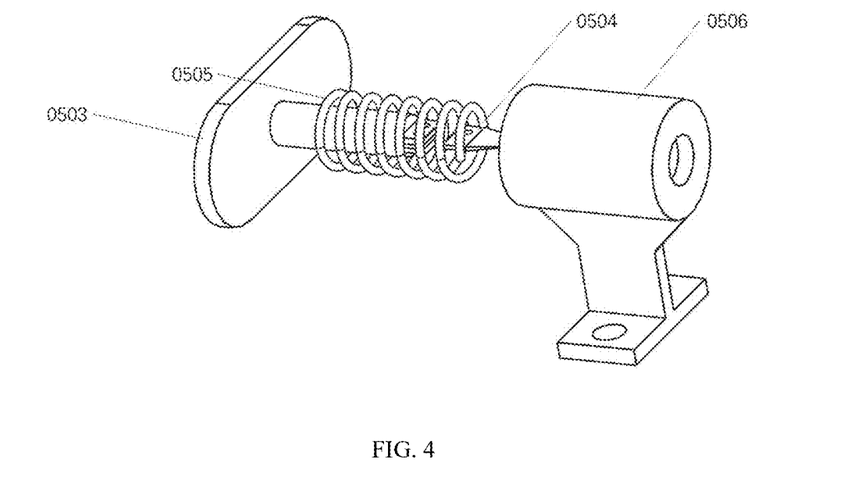
FIG. 4 is a schematic split diagram of a shearing module in the present invention.
Figure 5:
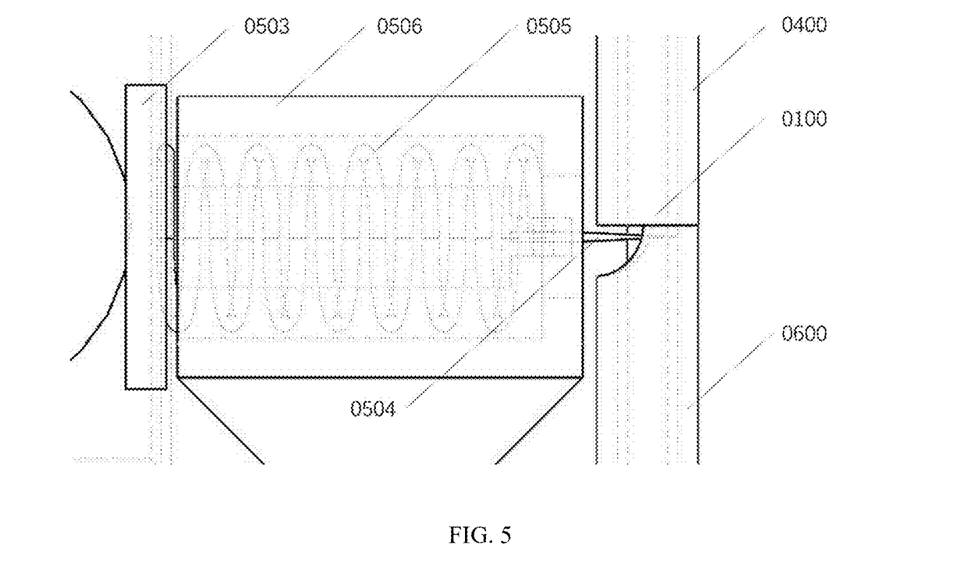
FIG. 5 is a partially schematic diagram of the shearing module during a shearing operation in the present invention.
Figure 7:
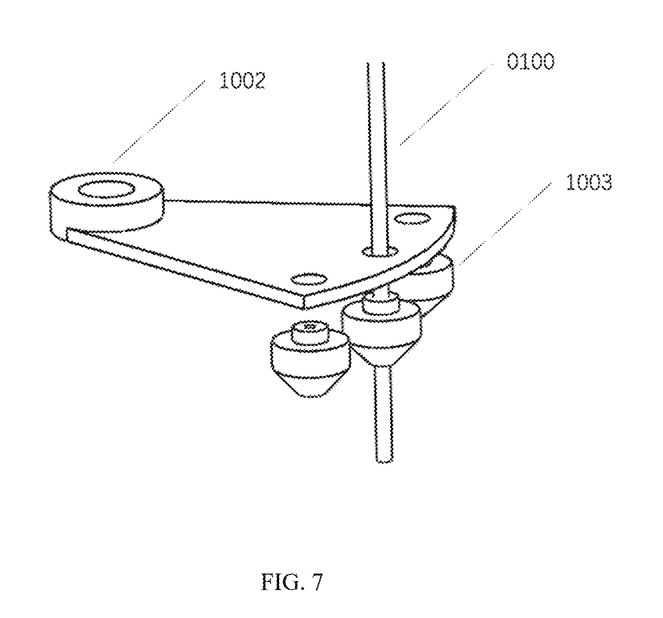
FIG. 7 is a schematic split diagram of a partial structure of a nozzle module in the present invention.

The wire feeding module 0300 includes a feeding motor 0301, a meshing gear 0302, a U-groove bearing 0303, a fixing bolt 0304, and a fixing nut 0305; the U-groove bearing 0303 is mounted with the fixing nut 0305 in an adjustment groove at the upper part of the bracket 0200 through the fixing bolt 0304; and the adjustment groove and a head of the fixing bolt 0304 are marked with scales, which can be used for adjusting a gap between the U-groove bearing 0303 and the meshing gear 0302 can be adjusted, so as to fit different diameter specifications of the pre-impregnated composite wire 0100 or meet requirements for different clamping and feeding states of the wire 0100. The meshing gear 0302 rotatably fits the U-groove bearing 0303 to guide feeding of the pre-impregnated composite wire 0100. The shearing module 0500 mainly includes a shearing motor 0501, a cam 0502, a push tool holder 0503, a cutting blade 0504, a reset spring 0505, and a track sleeve holder 0506; the cutting blade 0504 is fixed to the push tool holder 0503 through screws, passes through the reset spring 0505, and is fed into a sleeve of the track sleeve holder 0506 to form the shearing module; an aperture of the sleeve of the track sleeve holder 0506 on one side is larger than that on the other side, and the reset spring 0505 is limited to the small aperture side; the cam 0502 is fixed to a shaft of the shearing motor 0501 through a key; and the cam 0502 cooperates with the reset spring 0505 to push the push tool holder 0503 back and forth under the drive of the shearing motor 0501, so as to drive the cutting blade 0504 to achieve a horizontal cutting operation. The nozzle module 1000 mainly includes a rotating motor 1001, a nozzle support plate 1002, and several nozzles 1003, where the nozzle support plate 1002 is perpendicular to the throat pipe 0800 and mounted together with the rotating motor 1001 through keys; the nozzles 1003 are mounted on the nozzle support plate 1002 through threads, and the nozzles 1003 are evenly distributed on an arc with a rotating shaft of the rotating motor 1001 as a center and the distance between the center of the rotating shaft and the center of the throat pipe 0800 as a radius; and the rotating motor 1001 drives the nozzle support plate 1002 to rotate a set angle, and a target nozzle 1003 can be switched to be below the throat pipe 0800 and coaxial with the throat pipe 0800, so as to complete replacement of the nozzle 1003 of the printing head. Upper and lower surfaces of the nozzle support plate 1002 have a planeness of ≤0.1 mm; the nozzles 1003 are strictly consistent in height specifications, and can have the same or different aperture specifications according to actual needs; and after mounting, tips of the nozzles 1003 are coplanar and parallel to a bottom surface of the nozzle support plate 1002. The nozzle support plate 1002 has 7 threaded hole positions evenly distributed every 40° for the nozzles 1003. The nozzles 1003 include a main nozzle and secondary nozzles, where the secondary nozzles include spare nozzles and nozzles for other purposes. The spare nozzles have the same specification as the main nozzle, and are used for replacing the worn main nozzle; and the nozzles for other purposes have inner diameters greater than the inner diameter of the main nozzle, and are used for replacing the pre-impregnated wire 0100 with other specifications during printing.

There are two main cases in specific use. In the first case, in face of a jumper position during printing, a predetermined pause and shearing instruction is executed, and three-dimensional printing motion of the printing head and the wire feeding module 0300 are stopped; after the shearing module 0500 completes shearing, the three-dimensional printing motion of the printing head is restored until the remaining wire cut in the printing head is passively exhausted; and the printing head is stopped again and lifted by 15 mm in a printing Z direction, the wire feeding module 0300 restores feeding the wire 0100 until the wire 0100 passes through the nozzle 1003 by 10 mm, the printing head is lowered by 15 mm in the Z direction, and the three-dimensional printing motion of the printing head is restored together with the wire feeding module 0300, to continue the printing operation. In the second case, when a nozzle 1003 is required to be replaced during printing, a predetermined pause, shearing and nozzle 1003 replacing instruction is executed, and the three-dimensional printing motion of the printing head and the wire feeding module 0300 are stopped; after the shearing module 0500 completes shearing, the three-dimensional printing motion of the printing head is restored until the remaining wire cut in the printing head is passively exhausted; and the printing head is stopped again and lifted by 15 mm in the printing Z direction, and the nozzle module 1000 works; and after the replacement of the nozzle 1003 is completed, the wire feeding module 0300 restores feeding the wire 0100 until the wire 0100 passes through the nozzle 1003 by 10 mm, the printing head is lowered by 15 mm in the Z direction, and the three-dimensional printing motion of the printing head is restored together with the wire feeding module 0300, to continue the printing operation.

Embodiment 2

This embodiment is a specific application case of a printing method using the nozzle-replaceable printing head for continuous fiber reinforced composite additive manufacturing in the first embodiment, to print a continuous fiber reinforced thermoplastic composite pre-impregnated wire.

1) A target part is a 400 mm×360 mm×40 mm cube. A pre-impregnated composite wire (SCF+PLA)/CCF (the matrix is PLA added with 5% of short carbon fibers by mass, and the reinforcement is 1K continuous carbon fibers) is selected according to forming requirements of the target part, where the wire has a diameter of 0.8 mm, and an overall mass percentage of the fibers is about 32%.
2) A three-dimensional model of the target part is imported into open-source printing slice software Repetier-Host, hierarchical discrete slicing and path planning are performed, and a printing speed and basic printing process parameters are set, where the nozzle has a diameter of 1.4 mm, the printing speed is 5 mm/s, a layer thickness is 0.5 mm, a channel spacing is 1.2 mm, the nozzle is at a temperature of 215° C., and a printing platform is at a temperature of 60° C.; and basic printing forming data G code of the part is formed, where the printing time is about 22.3 days.
3) Each jumper position in the G code is analyzed. The model does not require any jumper. By combining the printing time, wear life of a nozzle 1003 and replacement requirements of the pre-impregnated wire 0100, the nozzle is replaced every 3 days, 120 mm code is advanced, totally 7 times of pause, shearing and nozzle 1003 replacing instructions are added, and the G code is updated. 1 main nozzle and 6 spare nozzles, totally 7 nozzles 1003, are mounted on the nozzle support plate 1002.
4) The pre-impregnated wire 0100 is threaded into the printing head until passing through the nozzle 1003 by 10 mm, and the fixing position of the fixing bolt 0304 in the adjustment groove is adjusted to a corresponding scale of the adjustment groove according to the diameter of the pre-impregnated wire 0100.
5) The G code is read, the heating coil 0900 is heated to the set printing temperature, the wire feeding module 0300 feeds the wire according to the printing speed, and the target part is printed in a layer-by-layer stacking manner according to the G code for a total of 80 layers.
6) When the nozzle 1003 is required to be replaced during printing, the predetermined pause, shearing and nozzle 1003 replacing instruction is executed, and three-dimensional printing motion of the printing head and the wire feeding module 0300 are stopped; after the shearing module 0500 completes shearing, the three-dimensional printing motion of the printing head is restored until the remaining wire cut in the printing head is passively exhausted; and the printing head is stopped again and lifted by 15 mm in the printing Z direction, and the nozzle module 1000 works; and after the replacement of the nozzle 1003 is completed, the wire feeding module 0300 restores feeding the wire 0100 until the wire 0100 passes through the nozzle 1003 by 10 mm, the printing head is lowered by 15 mm in the Z direction, and the three-dimensional printing motion of the printing head is restored together with the wire feeding module 0300, to continue the printing operation.
7) When the nozzle 1003 is replaced in the process of layer-by-layer stacking, step 6) is referred to until 80 layers of the target part are completed.

The technical means disclosed in the solutions of the present invention are not limited to the technical means disclosed in the foregoing embodiments, but further include technical solutions formed by any combination of the above technical features.

What is claimed is:

1. A nozzle-replaceable printing head for continuous fiber reinforced composite additive manufacturing, comprising a fixed bracket, a wire feeding module located at an upper part of a structure, an upper guide pipe, a shearing module located at a middle part of the structure, a lower guide pipe, a heat dissipation sleeve, a throat pipe, a heating coil, and a nozzle module located at a bottom of the structure, wherein a continuous fiber reinforced thermoplastic resin matrix pre-impregnated composite wire coaxially penetrates through a side of the printing head from a top to a bottom and is fed for printing;

wherein the upper guide pipe, the lower guide pipe, and the throat pipe are mounted on the fixed bracket through first threads, wherein a half-wrapped lower guide pipe has a hemispherical notch at an end, and when the shearing module performs a cutting operation, a cutting blade is configured to fit and cut into an inner wall of the half-wrapped lower guide pipe from the hemispherical notch of the half-wrapped lower guide pipe; the heat dissipation sleeve is mounted to an upper end of the throat pipe through second threads; and the heating coil is mounted to a lower end of the throat pipe.

2. The nozzle-replaceable printing head for continuous fiber reinforced composite additive manufacturing according to claim 1, wherein the wire feeding module comprises a feeding motor, a meshing gear, a U-groove bearing, a fixing bolt, and a fixing nut; the U-groove bearing is mounted with the fixing nut in an adjustment groove at an upper part of the fixed bracket through the fixing bolt; and a gap between the U-groove bearing and the meshing gear is allowed to be adjusted to fit different diameter specifications of the pre-impregnated composite wire or meet requirements for different clamping and feeding states of the pre-impregnated composite wire.

3. The nozzle-replaceable printing head for continuous fiber reinforced composite additive manufacturing according to claim 1, wherein the shearing module comprises a shearing motor, a cam, a push tool holder, a cutting blade, a reset spring, and a track sleeve holder; the cutting blade is fixed to the push tool holder through screws, and the reset spring is sleeved on the push tool holder; an end of the cutting blade is fed into an inner cavity of the track sleeve holder, an aperture of a sleeve of the track sleeve holder on a first side is larger than an aperture of the sleeve of the track sleeve holder on a second side, and the reset spring is limited to the second side; the cam is fixed to a shaft of the shearing motor through a key; and the cam cooperates with the reset spring to push the push tool holder back and forth under a drive of the shearing motor to drive the cutting blade to achieve a horizontal cutting operation.

4. The nozzle-replaceable printing head for continuous fiber reinforced composite additive manufacturing according to claim 1, wherein the nozzle module comprises a rotating motor, a nozzle support plate, and nozzles; the nozzle support plate is perpendicular to the throat pipe and mounted together with the rotating motor through keys; the nozzles are mounted on the nozzle support plate through threads; and the nozzles are evenly distributed on an arc with a rotating shaft of the rotating motor as a center and a distance between a center of the rotating shaft and a center of the throat pipe as a radius.

5. The nozzle-replaceable printing head for continuous fiber reinforced composite additive manufacturing according to claim 4, wherein the rotating motor drives the nozzle support plate to rotate a set angle, and a target nozzle is allowed to be switched to be below the throat pipe and coaxial with the throat pipe to complete a replacement of the nozzle of the printing head; the nozzles comprise a main nozzle and secondary nozzles, wherein the secondary nozzles comprise spare nozzles and nozzles for other purposes; the spare nozzles have a same specification as the main nozzle, and are configured for replacing a worn main nozzle; the nozzles for other purposes have inner diameters greater than an inner diameter of the main nozzle, and are configured for replacing pre-impregnated wires with other specifications during printing; upper and lower surfaces of the nozzle support plate have a planeness of ≤0.1 mm; the nozzle support plate is provided with 3-9 threaded hole positions for mounting the nozzles, and the threaded hole positions are evenly distributed every a fixed angle; and the nozzles have identical height and size specifications, and after mounting, tips of the nozzles are coplanar and parallel to the lower surface of the nozzle support plate.

6. The nozzle-replaceable printing head for continuous fiber reinforced composite additive manufacturing according to claim 2, wherein the adjustment groove and a head of the fixing bolt are marked with scales.

* * * * *